Aug. 12, 1924.

P. W. LITCHFIELD 1,504,694

VEHICLE TIRE

Filed Aug. 27, 1921

Inventor
Paul W. Litchfield
By R. S. Trogner
Attorney

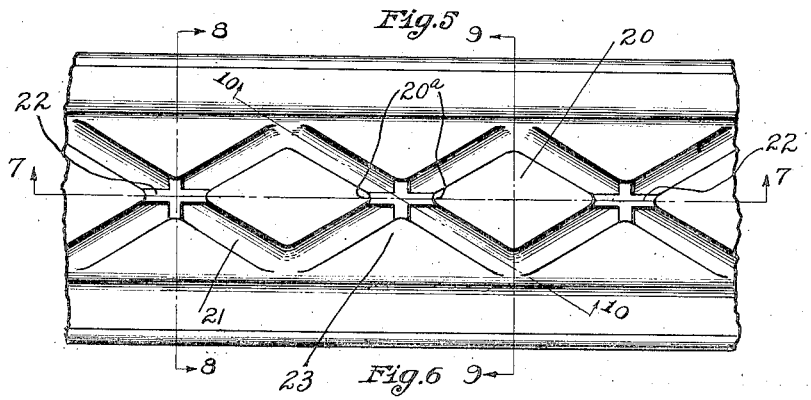
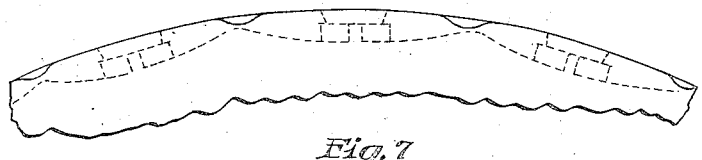
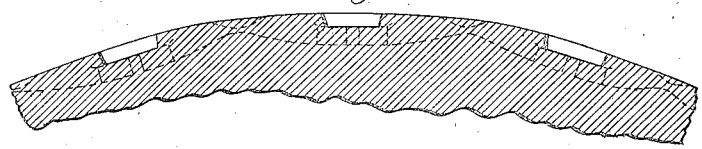
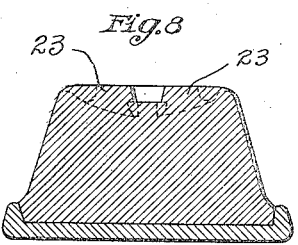
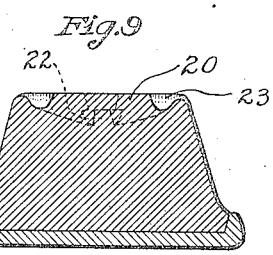
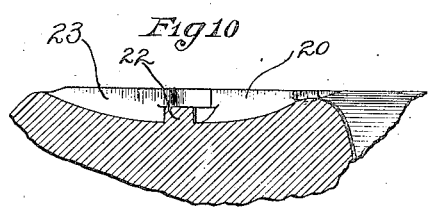

Patented Aug. 12, 1924.

1,504,694

UNITED STATES PATENT OFFICE.

PAUL W. LITCHFIELD, OF AKRON, OHIO, ASSIGNOR TO THE GOODYEAR TIRE & RUBBER COMPANY, OF AKRON, OHIO, A CORPORATION OF OHIO.

VEHICLE TIRE.

Application filed August 27, 1921. Serial No. 495,866.

*To all whom it may concern:*

Be it known that I, PAUL W. LITCHFIELD, a citizen of the United States, residing at Akron, in the county of Summit and State of Ohio, have invented new and useful Improvements in Vehicle Tires, of which the following is a specification.

My invention relates to cushion tires and it is particularly directed to the provision of a tread surface that shall have improved operating characteristics.

In cushion tires that have heretofore been devised, it has been customary to so form the non-skid tread figures that they apparently stand out from the body of the tire and are of substantially the same height over the tread surface.

My improved tire has the tread figures delineated by a series of indentures in the tread face. The tread figures therefore have the appearance of being formed as a part of the body of the tire instead of being raised above the tire body. These elements of distinction and the advantageous operating characteristics that are inherent in my improved form of tire can be most readily understood by referring to the accompanying drawings, in which:

Figure 5 is a plan view of the tread surface of a tire embodying a modified construction and incorporating the essential features of my invention;

Figure 6 is a side view of a portion of the tire shown in Fig. 5;

Figure 7 is a fragmentary sectional view taken on the line 7—7 of Fig. 5;

Figure 8 is a transverse sectional view taken substantially on the line 8—8 of the tire shown in Fig. 5;

Figure 9 is a corresponding sectional view taken on the line 9—9 of the tire shown in Fig. 5; and Fig. 10 is a sectional view through one of the indentures taken on the line 10—10 of Fig. 5.

In the discussion of my improved form of tire, I have chosen tread figures of diamond form as clearly illustrating the principles of my invention. This is, however, not to be construed as a limitation of my invention, since any tread figure embodying like characteristics could be employed.

Attention is first invited, to the tire shown in Figures 1 to 4, inclusive, of the accompanying drawings, which has a series of indentures 10 traversing the tread surface. These indentures delineate tread portions 11 of substantially diamond shape and portions 12 that extend from the side of the tire to the tread face to complete the design of the surface. The indentures, that have been shown as illustrative of the principles of my invention, extend diagonally relative to the edge of the tire.

One of the features of major importance with relation to the tread indentures, is the fact that the depth of each of the indentures increases directly in accordance with its distance from the side of the tire. The effect of this variation in the depth of the indentures is to form separated tread portions that are of greater depth along the median line of the tire than along its edges.

Figure 1:
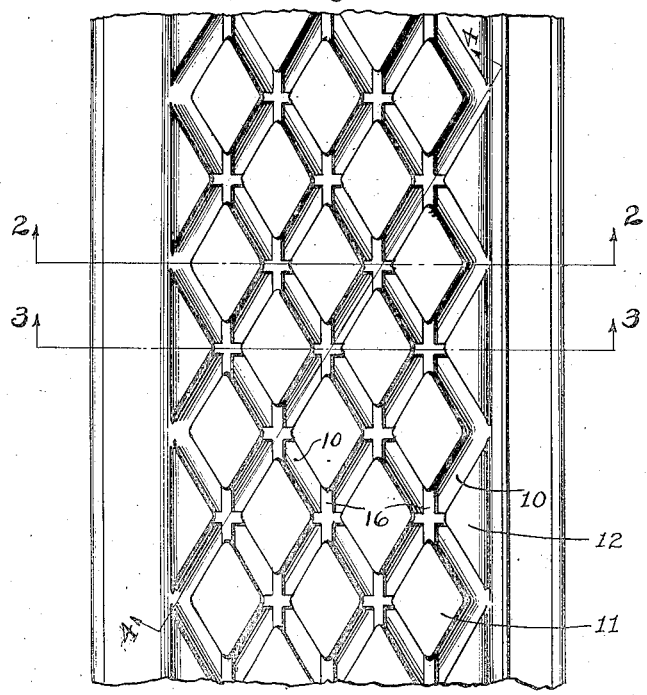
Figure 1 is a plan view of a portion of the tread surface of a tire manufactured in accordance with my invention.
Figure 2:
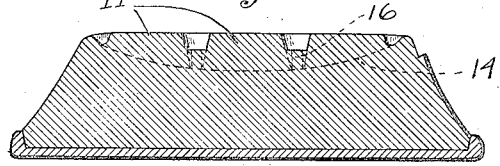
Figure 2 is a fragmentary transverse sectional view taken substantially on the line 2—2 of Fig. 1 and looking in the direction of the arrow.
Figure 3:
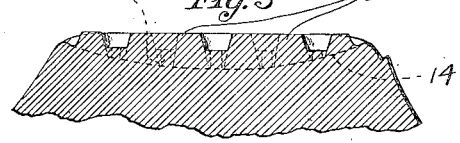
Figure 3 is a similar sectional view, taken substantially on the line 3—3, of the tire shown in Figure 1.
Figure 4:
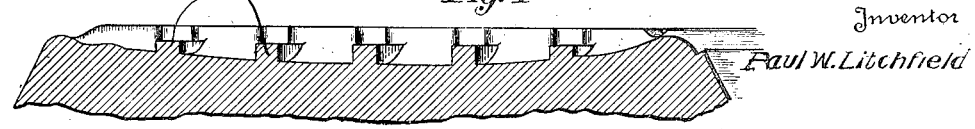
Figure 4 is a sectional view taken through the longitudinal center of one of the indentures, and is indicated as being taken on line 4—4 of Figure 1.

This particular feature is most clearly indicated in Figures 2, 3 and 4. The diagonal sectional view of the tire shown in Fig. 4, which represents the section formed by a plane passing through the bottom of one of the indentures or grooves in the tread of the tire, indicates, in a general way, the manner in which the depth of the groove or indenture increases as it progresses toward the middle of the tire, and decreases as it approaches either of the outer edges. In this showing, the surface curvature of the tire has been neglected for the sake of clearness of illustration. The tire is shown as though its tread surface were a plane surface such as would be formed by cutting the tire transversely and placing it on a plane surface.

Since all of the grooves or indentures 10 are of the same general form, the circumferential projection of the bottoms of the indentures on a transverse sectional plane form a concave line that is indicated in Figure 2 as the line 14.

If such a line is assumed to be a base line for use in designing a tire, the depth of any groove or indenture will be determined at any point on the tread surface by the distance below the tread surface of the line 14. This line, therefore, constitutes a locus of the circumferential projections of the bottom lines of the several grooves or indentures.

It is also important to maintain the width of the indenture somewhat less than the width of the tread figures. This is obtained by spacing the indentures in each series a greater distance than the width thereof.

Since the upstanding tread figures are of much greater depth in the zone of the median plane of the tire than along the edges of the tread surface, some provision is obviously desirable to stiffen the centrally located figures without materially altering their resilient characteristics. For this purpose a series of reinforcing elements 16 are formed between adjacent tread portions in such manner as to support such portions against abnormal lateral displacement. These reinforcing elements are positioned within the indentures, preferably at their intersections, and are preferably disposed a uniform distance below the tread surface. The sectional views shown in Figures 2, 3 and 4 indicate the relative position of the several reinforcing elements.

The improved operating characteristics of my tire will be appreciated if attention is directed to the increased resilient features that are inherent when tread portions of greater depth are formed along the median portion of the tread than have heretofore been provided in tires of this type.

It has heretofore been cutomary to form tread portions of substantially uniform depth on the tire body. This resulted in an inner tread surface that was less yielding than the outer tread surface of the tire by reason of the greater confinement against expansion of the several inner tread portions. It was necessary in such instances to provide relatively shallow tread figures in order that the buttons or tread portions delineated by the indentures would not be destroyed or mutilated by the lateral thrust on the tread surface. A very definite limitation was, therefore, imposed on the depth of the tread portion that might be employed with flat faced tires having tread figures separated by the indentures or where the figures were formed above the tread body.

The use of indentures having varying depth, particularly in conjunction with the reinforcing strips formed between tread portions, renders it possible to construct tread portions of much greater depth than has heretofore been customary.

The lateral shear that is imposed at the edges of the tire tread is effectively restricted by the comparatively shallow tread portion formed at that point, whereas near the center of the tire where the shear forces are minimized, the tread portions have much greater depth and, therefore, greater yieldability in taking up these thrusts, and also embody the additional advantages of cushioning blows imposed at the center of the tire much more effectively than has heretofore been possible with wide faced cushion tires.

Figures 5 to 9, inclusive, illustrate a modification of my invention in which only a single series of separated tread portions 20 are formed on the tread surface of the tire by the intersecting indentures 21. Reinforcing elements 22, that are similar in character and form to the corresponding element 16 shown in the previously described tire, are formed between adjacent tread portions of the tire. The edge portions 23 of the tread surface form an effective protection for the points 20ª of the tread figures. The varying depth of the several indentures is effectively shown in Fig. 10, which is a sectional view on a plane extending along the line 10—10 of Fig. 5. This illustrates very clearly the increased depth of indenture near the median line of the tire. It is believed that, in view of the preceding discussion of the operation of the tire shown in Figures 1 to 4, additional discussion of the features of the tire shown in Figs. 5 to 10, inclusive, is unnecessary.

Although I have illustrated and described only two forms of my invention, it will be apparent that the principles thereof can be employed to construct many other forms of resilient tires and embodying different tread designs. I desire, therefore, that only such limitations shall be imposed on the spirit and scope of my invention as are indicated in the accompanying claims.

What I claim is:

1. A resilient tire having relatively narrow indentures of uniformly varying depths in the tread surface, said indentures being of greatest depth along the median plane of the tread and being spaced a greater distance than the width of the indentures.

2. A resilient tire having a substantially flat tread surface and relatively narrow tread indentures in said surface of uniformly varying depths, the depth of the indentures being greatest at the center of the tread surface, and said indentures being spaced a greater distance than the width thereof.

3. A resilient tire having a series of relatively narrow intersecting tread indentures of varying depths such that a surface passed through the bottoms of said indentures would be outwardly concave on any transverse section.

4. A resilient tire having a series of intersecting tread indentures of varying depths, each of said tread indentures being of such depth that the locus of the circumferential projection of the radially innermost points of each indenture on a transverse section of the tire forms a line concave relative to the locus of the tread surface upon the transverse section of the tire.

5. A resilient tire having relatively narrow tread indentures of varying depths, the depths of said indentures varying directly in accordance with their distance from the side of the tire and the distance between adjacent indentures being greater than the width of the indenture.

6. A resilient tire having relatively narrow intersecting tread indentures of varying depths, and a substantially flat tread surface, the depth of said indentures at any point varying directly in accordance with their distance from the side of the tire.

7. A resilient tire having indentures delineating a series of tread portions, and reinforcing strips extending between adjacent tread portions, said reinforcing strips being of less height than the depth of said indentures.

8. A resilient tire having a series of indentures formed in the tread surface, and reinforcing elements formed between adjacent tread portions delineated by said indentures, said reinforcing elements being formed a uniform distance radially inward from the tread surface.

9. A resilient tire having a series of intersecting indentures in the tread surface, and reinforcing elements connecting adjacent tread portions delineated by intersecting indentures.

10. A resilient tire having a series of intersecting indentures of varying depths in the tread surface thereof, the depths of said indentures varying in accordance with the lateral distance from the side of the tire, and reinforcing elements connecting adjacent tread portions delineated by intersecting indentures.

11. A resilient tire having a series of intersecting indentures of varying depths in the tread surface thereof, the depths of said indentures varying in accordance with the lateral distance from the side of the tire, and reinforcing elements connecting adjacent tread portions delineated by intersecting indentures, said reinforcing elements being disposed radially inward from the tread surface.

12. A resilient tire having tread portions delineated by indentures of varying depths, and reinforcing elements disposed within said indentures for reinforcing said tread portions.

13. A resilient tire having tread portions delineated by indentures of depths varying in accordance with their distance from the lateral face of the tire, and reinforcing elements formed within the deepest portions of the indentures connecting adjacent tread portions.

14. A resilient tire having tread indentures of uniformly varying depths, said indentures being formed obliquely relative to the transverse and median planes of the tire.

15. A resilient tire having indentures in the tread surface of uniformly varying depths, said indentures being adapted to separate tread portions into complete unitary figures.

16. A resilient tire having a plurality of separated tread portions adapted to form a substantially flat tread surface, the tread portions disposed along the median line of the tire being of greater depth than the other tread portions.

In witness whereof I have hereunto signed my name in the presence of two subscribing witnesses.

PAUL W. LITCHFIELD.

Witnesses:
 E. J. THOMAS,
 WM. C. McCOY.